United States Patent [19]

Connery

[11] Patent Number: 4,883,520
[45] Date of Patent: Nov. 28, 1989

[54] WATER TREATMENT APPARATUS AND METHOD

[75] Inventor: Colin A. Connery, Mt. Vernon, N.Y.

[73] Assignee: Living Water Corporation, Chicago, Ill.

[21] Appl. No.: 238,526

[22] Filed: Aug. 29, 1988

Related U.S. Application Data

[63] Continuation of Ser. No. 943,423, Dec. 19, 1986, abandoned.

[51] Int. Cl.⁴ ............................................. C02F 1/22
[52] U.S. Cl. ...................................... 62/542; 62/123; 62/124
[58] Field of Search .................. 62/123, 124, 532, 542

[56] References Cited

U.S. PATENT DOCUMENTS

| | | | |
|---|---|---|---|
| 3,377,814 | 4/1968 | Othmer | 62/123 X |
| 3,400,549 | 9/1968 | Karnofsky | 62/123 X |
| 3,461,679 | 8/1969 | Goldberger | 62/123 X |
| 4,164,854 | 8/1979 | Martin | 62/123 X |
| 4,291,550 | 9/1981 | Engdahl et al. | 62/123 X |
| 4,509,344 | 4/1985 | Ludwigsen et al. | 62/123 X |
| 4,517,806 | 5/1985 | Korzonas | 62/123 |

Primary Examiner—William E. Tapolcai
Attorney, Agent, or Firm—Clement and Ryan

[57] ABSTRACT

An apparatus for removing polluted clinging water from ice. The dirty ice pieces are introduced at the bottom of a column of water and are rinsed by progressively cleaner water as the ice pieces float to the surface.

25 Claims, 1 Drawing Sheet

WATER TREATMENT APPARATUS AND METHOD

This application is a continuation of co-pending application Ser. No. 943,423 filed by the same inventor on Dec. 19, 1986, now abandoned.

This invention relates to apparatus and method that may be used to treat water (1) to remove dissolved foreign substances therefrom, or (2) if desired, to increase the concentration of those foreign substances. More particularly, it relates to such an apparatus and method utilizing a freezing technique to separate the water and the dissolved substances.

BACKGROUND OF THE INVENTION

The extraction of dissolved foreign matter from water is among the most important of industrial processes. Creating potable fresh water from sea water and the extraction and reclamation of dissolved industrial chemicals from waste water are two instances in which water distillation serves a vital economic and environmental role.

The most common method for distilling water entails a vapor cycle such that the condensate provides pure water while the dissolved foreign matter remains behind in the unvaporized source water. A less common alternative involves freezing, with the melt providing pure water and the remaining unfrozen source water retaining the foreign matter.

There are major thermodynamic advantages to the ice cycle. For example, it takes seven times as much heat to vaporize a given quantity of water as it takes to freeze it. Heat pump losses are therefore reduced in the ice cycle method by almost an order of magnitude. Other factors favoring the ice cycle include the elimination of concerns relating to vapor lock from gases dissolved in the source water, as well as reduced salt corrosion and scaling of the distilling apparatus.

A problem peculiar to the ice cycle is the tendency of impure source water to cling to the ice after it has been formed. It is customary with the ice cycle process, as in Korzonas U.S. Pat. No. 4,517,806, to use water that has already been distilled, or is otherwise sufficiently pure, to rinse the ice crystal pack before it is melted. This rinsing process—typically carried out in what may be called a wash column—has been identified as a major source of inefficiency since there is frequently a partial loss of ice due to a premature melt which is flushed along with the rinse water.

In principle, such losses in the rinse operation can be reduced and the purity of the product water improved by not immediately disposing of the fresh water which has been used to rinse the ice. Instead, this water could be reused in one or more rinse operations which precede the final rinse operation. The purity of the water product can theoretically be increased and the amount of rinse water required reduced to any desired value simply by incorporating a sufficient number of sequential rinse operations in which rinse water is reused. However, the additional mechanical complexity and energy requirement associated with each rinse, along with the melt losses incurred in each rinse, have discouraged such an approach.

In a typical prior art wash column such as disclosed in Martin U.S. Pat. No. 4,164,854 or the above mentioned patent to Korzonas, ice crystals are consolidated or packed together into a porous mass—which may be called an ice crystal pack, ice block or ice plug—by means of flotation pressure, in combination with the upward hydraulic pressure of the incoming salt water or ice/brine slurry. The hydraulic pressure also serves to propel the ice plug in an upward direction.

The density, porosity and draining characteristics of such an ice crystal pack, ice block or ice plug depend upon the particular conditions under which it is formed. This fact inevitably affects the efficiency of the resulting water purification. Thus, the unpredictable structure of the porous ice plug insures that the water will drain preferentially along those paths which offer the least resistance. Paths which offer more resistance are insufficiently rinsed, and in the extreme case there exist "bowls" or pockets of fused ice crystals which hold brine that is inaccessible to the rinse water.

When no rinse step is included, as in the above mentioned Martin patent, the brine is essentially squeezed out of the ice block formed by the compacting of a number of small ice crystals. Because of the unpredictable structure of the block formed according to this prior art teaching, there are again unavoidable deficiencies in this method of water purification.

OBJECT OF THE INVENTION

My invention is a reliable, inexpensive mechanically simple and energy efficient means for executing the equivalent of a sequential multi-stage rinse process in which there is the equivalent of very many stages with only a minimal loss of rinse water.

SUMMARY OF THE INVENTION

The complete apparatus of this invention may be used to treat a salty water product, which may be water containing dissolved foreign substances or a mixture of such water with small pieces of ice, to remove a sufficient amount of the foreign substances to produce water having a desired low concentration of those substances and a remaining brine having a greater concentration of the foreign substances. The apparatus of the invention may also be used, in a reverse manner, for the processing of natural fruit juices to produce a juice concentrate.

In its complete combination form, the present apparatus invention consists of an effectively stratified column of water—with the greatest concentration of dissolved foreign substances at the bottom and the lowest concentration of those substances at the top—chilled to the freezing temperature, in which column small, individual pieces of ice float upward freely and separately, without being packed together with any other pieces of ice, from the bottom to the top of the water column. The invention includes (1) means for introducing the small, individual pieces of ice into the column of salt water, (2) means for removing the pieces of ice after they have floated to the top of the column without becoming compacted with each other, (3) means for introducing added rinse water at the top of the water column, (4) means for removing heavy brine from the bottom of the column of water, and (5) means for introducing at the bottom of the column a quantity of added salt water to be treated.

The apparatus is adapted to maintain a necessary volume relationship between the introduction and removal of the pieces of ice, the introduction of added rinse water, the removal of heavy brine, and the introduction of salt water to be treated. In addition, the means for accomplishing these various steps are all adapted to minimize the impartation of stirring or mixing motion to the water column. Use of the apparatus produces an effectively stratified vertical column of salt water containing at least one foreign substance dissolved therein, in which the concentration of the dissolved foreign substances varies substantially continuously from the greatest concentration at the bottom of the column to the lowest concentration at the top of the column. In addition, the concentration at any given level in said column of water is substantially the same throughout that level. Hence the use of the shorthand or graphic term, for a description of the resulting column, as "an effectively stratified" column of water.

The invention also includes as one aspect apparatus for producing the effectively stratified column of salt water just described.

A subcombination apparatus invention includes the equipment components that make up the complete combination, except that the water column and pieces of ice contained therein are not included.

As indicated above, the method of this invention may be used to produce ultrapure water, or, conversely, to produce concentrates of liquids such as fruit juices.

The terms "salt water," "saline water," or "brine" as employed in this specification and in claims shall mean water in which foreign substances of various kinds and concentrations are dissolved. By the same token, the term "salt" as used in this specification and claims means any of said substances, and the term "salty" means containing any of such substances dissolved therein.

The foreign substances in question may be impurities if the goal is purification of water, for example, or may be part of the desired end product when the goal is to produce a concentrate such as concentrated orange juice. Thus the term "heavy brine" is used to include both (1) what is referred to as "waste brine" in a water purification process, and (2) what would be the desired end product in a fruit juice concentration process.

In referring to the starting product for the method of this invention, the term "salty water product" is used in this specification and claims to mean either (1) salt water, or (2) a mixture of salt water with small pieces of ice such as an ice/brine slurry.

PRINCIPLE OF THE INVENTION

A clear understanding of the principles underlying the operation of my invention can be obtained by reference to the familiar problem of cleaning paint brushes.

With only a single can of fresh turpentine, a brush can be made only as clean as the turpentine becomes dirty. Two cans are better because the brush can be rinsed a second time in fresh turpentine. Reasoning by induction, it is apparent that any degree of cleanliness can be realized if only one has a sufficient number of cans.

A second advantage to the multiple rinse process is a saving in turpentine. With several cans it becomes possible to clean several brushes before the last rinse can becomes polluted to the point of requiring replacement. When this need arises, instead of replacing the last (most clean) rinse can, the prudent painter will throw out the contents of the first (most dirty) rinse can and fill it with fresh turpentine and promote it to the position of last (most clean) rinse. In this manner the painter disposes of more "gunk" and consumes less turpentine than would be the case with a rinse process involving fewer cans. As a practical matter, constraints on available space and time limit even professional painters to only a few cans.

In my water purification invention I eliminate what would be analogous to the painter's need for separate cans by taking advantage of two natural properties of water and ice that permit effective stratification of the salty water and flotation of the ice. The first is the fact that a column of water that varies in salinity (or concentration of other dissolved matter) from fresh on the top to very salty on the bottom will be stable and effectively horizontally stratified because the specific gravity of the water will increase continuously as the salt content increases. As will be seen, the column of water is effectively stratified because the concentration of the dissolved foreign substance at any given level in the column of water is substantially the same throughout that level.

The second relevant property is that ice floats in water. Because ice has a lower specific gravity than even fresh water, pieces of ice that are introduced—either from the exterior or formed in situ—at the bottom of a stable, effectively stratified water column will float to the surface. In passing from the bottom to the top, the pieces of ice will be continuously rinsed by water having an ever decreasing concentration of salt.

Now we shall consider how this process can be implemented for the purpose of extracting fresh water from sea water. We begin with a column filled with sea water and a heat pump with its hot end at the top of the column and the cold end at the bottom. Small pieces of ice are introduced (in the particular embodiment being described, by forming or generating in situ) at the bottom portion (the cold end). These pieces of ice then rise freely and separately, without being packed together, to the top portion (the hot end) where in one embodiment of this invention they are melted. During the rise of these small pieces of ice to the top portion of the column through various levels of water, water clinging to these pieces of ice that contains salt dissolved therein as a foreign substance is rinsed off the pieces of ice by water at successively higher levels in the column.

The first ice that is produced will rise to the top and melt, leaving the bottom a little more salty and the top more fresh. As more ice is produced it will rise to the top and be rinsed by the first melt and, as a result, be even less salty when it is melted than was the first melt. Likewise the third portion of ice will be sequentially rinsed by the first and second melt. In practice these freeze, rinse and melt operations would be continuous, resulting in a water column that is in effect highly stratified with local salt concentrations that vary continuously at successive levels from top to bottom.

When water of sufficient purity is obtained at the top of the column, it becomes possible to remove fresh water from the top. So long as the rate of fresh water withdrawal is equal to the rate at which pieces of ice are introduced into the bottom portion of the column, the effectively stratified column of salt water remains essentially undisturbed.

As the process continues there will, of course, occur a gradual mixing and migration of salt from lower strata to higher strata. This is so because salt water clinging to each small piece of upwardly flowing ice is carried from one level to a higher level, where it is rinsed off the piece of ice by the water at that higher level. This is analogous to the gradual pollution of the last (most clean) paint can. One response is to add fresh, distilled water in the top portion of the column and remove a like volume of heavy brine from the lowest point in the column. In practice we can realize this same end by leaving some of the melt water in the top of the column and removing a similar volume of heavy brine from the bottom portion of the column.

ADVANTAGES OF THIS INVENTION

One of the main advantages to my invention is that it works best with small ice particles. This happens because the terminal velocity of a piece of ice as it floats to the surface is largely a function of its surface area to volume ratio. Small pieces will rise more slowly and be rinsed more thoroughly than large pieces. Also, the small pieces have a smaller, more localized turbulent wake and will therefore exhibit a less destructive stirring action.

Another advantage of small ice pieces is that they can be grown very quickly, free of flaws, from microscopic seed crystals. In contrast, larger crystals grow more slowly and are more likely to possess salt entraining flaws.

In the existing ice cycle processes involving a rinse operation, large crystals are preferred because the reduced surface area to volume ratio reduces the amount of clinging water which must be removed in the rinse operation. A problem with large ice crystals is that they often have brine entraining flaws which degrade the purity of the product water. However, in my process no such compromise is necessary and a very high degree of purity can be realized.

Another advantage of my invention is the elimination of premature melting during the rinse operation. This is a consequence of temperature stratification within the column which in turn is caused by the varying salt concentration. The salt depresses the local freezing temperature such that more salt causes a greater depression in freezing temperature. Hence the pieces of ice which are introduced from the exterior, or formed in situ, at the bottom portion of the column where the salt concentration is greatest will have the lowest temperature. As a cold piece of ice rises through regions of lower salt concentration and higher freezing point, there will occur a slight enlargement of the ice crystal as water from the upper strata freezes onto the colder piece of ice. Thus, in a well insulated column, no melt occurs at any level.

Another feature of my invention may be compared favorably to the corresponding process in vapor cycle distillers. Where high distillate purity is sought in a vapor cycle distiller, elaborate baffles and filters are used to entrap tiny polluting water droplets which typically are generated along with, and are carried along by, the steam vapor. In time, these baffles and filters become polluted, which results in decreased product purity. In contrast, the process of my invention employs counter-flow rinsing in which the rinse water is fully exploited, and is ultimately vented from the system as a part of the heavy brine, thereby insuring that product purity is sustained throughout the life cycle of the distillation apparatus without having to clean the apparatus or use disposable filters.

In existing art that employs a rinse operation, such as the Korzonas patent referred to above, ice wash columns inject the ice and brine mixture at the bottom or middle of the column. Instead of floating upward, the ice is packed together and driven upward by the pressure of the brine water being forced upward through the porous ice pack. Rinse water is introduced at the top of the bed of porous ice and filters downward by means of gravity drainage. At a point approximately midway between the bottom and top of the column there are located drains which remove the brine and rinse water from the ice through use of screens to separate the liquid from the ice. In the terminology of the art, there exists a "brine crown" which marks the surface where the downward flowing rinse water meets the upward flowing brine. At this juncture, there occurs an abrupt transition from fresh to saline water.

According to the logic of my invention, it is the abrupt transition at the "brine crown" just mentioned that causes extensive and wasteful mixing, and is a major factor limiting the performance of existing ice separation columns. In an ice separation column in accordance with my invention, the transition from saline to pure water is made as gradual as possible.

Since the porous structure of an ice plug as formed in prior art processes is inherently random and irregular, there will necessarily be an unbalanced distribution of rinse water (when that is used) as it follows the various paths of least resistance through the porous plug. As a result, some ice pieces will be rinsed more than necessary while others are not adequately rinsed.

The use of my process begins with a pre-existing stable, effectively stratified column of water (produced as explained above) into which ice pieces are introduced (either by in situ formation or by insertion from outside the column) near the bottom of the column. The rate of ice input is limited so as to insure that each ice piece is able to float freely up the entire length of the rinse column. Thus, each ice piece is thoroughly rinsed in a balanced manner.

A rinse column in accordance with my invention will also exhibit other useful properties which serve to distinguish it from the existing art. For example, for reasons set forth in the description of the preferred embodiment in the Description of the Preferred Embodiment below, there exists a direct relationship between the height of the column and product purity. Also, in accordance with my invention waste brine is drawn from the lowest point in the column.

An important historical note may be found in some of the earliest known work on ice wash columns, performed by Bosworth and associates for the Office of Saline Water of the United States Department of the Interior. In progress report #32 in section 2.2.2.4 there occurs this observation: "It is interesting to note, however, that a taller wash column or the existing column operating at low ice rates can produce acceptable product at negative wash ratios."

It is apparent that these investigators in the course of experiment observed the natural relationship between column height and performance. It is also apparent that in operating the column at lower ice rates the column is brought nearer to the optimal situation where the ice is free to float to the surface. However, to the knowledge of this inventor these investigators provided no explanation for what they observed, nor did they exploit the opportunity revealed in this isolated observation.

DESCRIPTION OF THE PREFERRED EMBODIMENT

Figure 1:
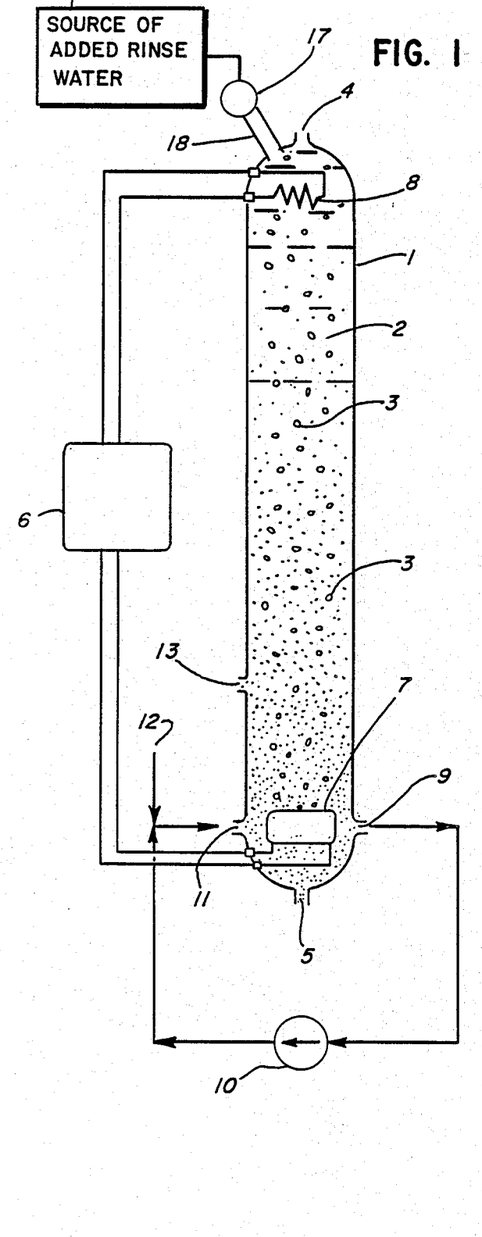
FIG. 1 is a schematic diagram of apparatus in accordance with the present invention, showing the invention in use to produce pure water output from salty water input.

FIG. 1 is an apparatus comprised of a straight, watertight, heat insulated duct 1, sealed at each end, with a plumb central axis. The duct is filled with a column of water 2 in which there are dissolved salts or other foreign substances and in which ice crystals 3 are floating upward. Column of water 2 is effectively stratified so that the concentration of dissolved salts increases from the top with depth.

At the top end of the duct is located a fresh water outlet pipe 4. At the bottom of the duct 1, there is a waste brine outlet pipe 5.

Heat pump 6 is used to draw heat from the ice maker 7, and dump the heat in the ice melter 8.

Brine from the lower end of the column 1 is drawn out through the circulation drain or outlet 9 located in the side wall of the duct 1, by the circulation pump 10. In the embodiment disclosed, this brine is then recirculated for presenting to the ice maker located in the duct 1 through the brine outlet 11.

Brine 12 ready for processing enters the system through brine inlet 11 located adjacent the bottom end of the duct 1, where it merges with the circulating brine. An even better alternative is for the input brine to enter the system at 13, at a level where the local water salinity matches the salinity of the input brine.

In operation, source brine (comprising in this embodiment input brine and circulating brine) passes over the ice maker 7, in which a fraction of the brine water is crystallized. The ice crystals 3 float to the top of the rinse water column 2, where they are melted by the ice melter 8. Fresh water is drawn from the rinse apparatus through the outlet 4. Enriched waste brine is drawn from the bottom of the rinse apparatus at the outlet 5.

The apparatus requires an operating temperature halfway between the desired freeze and melt temperatures. If the ambient temperature or the temperature of the brine to be processed is above that operating temperature an additional heat pump (not shown) would be used to compensate for such departure from the required operating temperature.

In the embodiment disclosed in FIG. 1, ice maker 7 comprises means for introducing small, individual pieces of ice 3 into the bottom portion of main column of salt water 2. As will be seen from the drawing and from the description above, these individual pieces of ice 3 are introduced at such a rate and in such a manner that they float freely and separately from the bottom portion to the top portion of the column, without being packed together. As they rise, water containing the foreign substances that clings to ice pieces 3 is carried up through main column 2, and is rinsed off pieces of ice 3 by water at successively higher levels in the column of water.

Figure 2:
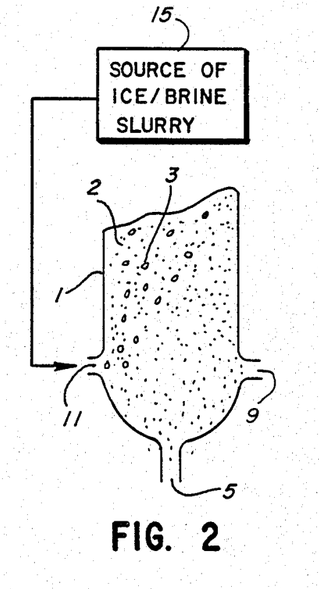
FIG. 2 is a fragmentary schematic diagram of another embodiment of the apparatus of this invention, showing means for introducing an ice/brine slurry into the column of water for treatment therein.

FIG. 2 gives a schematic showing of means for introducing small individual pieces of ice 3 into main column of salt water 2 at its bottom portion that includes means for forming the pieces of ice outside body of salt water 2. The pieces of ice are then introduced into the body of salt water as part of an ice/brine slurry from slurry source 15.

In the embodiment illustrated, the means for removing small, individual pieces of ice 3 from the top of main column of salt water 2 after they have floated freely and separately, as described above, up to the top portion of column 2 includes ice melter 8 (which heats a zone adjacent the top wall of the upper portion of duct 1).

As explained below in this specification, a part of the melted ice can be left in body of water 2, to be retained as additional rinse water in the column of salt water. When the desired end product from the use of the apparatus of this invention is water of a predetermined degree of purity (as in the embodiment of FIG. 1), the volume of the additional rinse water retained in column of salt water 2 as just described is the quantity necessary to maintain the concentration of foreign substances at a level no higher than a first predetermined concentration.

If desired, the added rinse water introduced into column 2 may be derived from an external source of fresh water. A schematic showing of such a source 16, which feeds fresh water through valve 17 and inlet pipe 18, is given at the top of FIG. 1.

Drain or outlet 9 defined in the side wall of duct 1 provides a means for removing heavy brine from the bottom portion of main column of salt water 2. When the apparatus of FIG. 1 is used, as in the embodiment illustrated, to produce water at outlet pipe 4 containing a predetermined maximum concentration of foreign substances or, in other words, a predetermined degree of purity, heavy brine is removed through outlet 9 in an amount necessary to maintain the volumetric balance in the apparatus that is referred to below. When the apparatus is used to produce a concentrate—for example, of a fruit juice—of a second predetermined maximum concentration, the quantity of heavy brine removed through outlet 9 is whatever is necessary to maintain the concentration of the foreign substances in the withdrawn brine at the predetermined maximum concentration. This second predetermined concentration is higher than the first predetermined concentration referred to just above.

Brine inlet 11 comprises means for introducing a quantity of added salt water into column of salt water 2.

In the use of this apparatus, the equal volumetric relationship between (1) the volume of added salt water, (2) the volume of any small individual pieces of ice 3 introduced from outside duct 1 into water column 2, and (3) the volume of any additional rinse water introduced from outside duct 1 into the top portion of water column 2, on the one hand, and (1) the volume of pieces of ice 3 removed from the top portion of duct 1 (either as melted product water or as actual pieces of ice) plus (2) the volume of any heavy brine removed from the bottom portion of column 2, on the other hand, is substantially maintained.

As has been emphasized above, it is important that the means for introducing and removing pieces of ice 3, the means for introducing added rinse water, the means for removing heavy brine, and the means for introducing added salt water all be adapted to minimize the impartation of stirring or mixing motion to column of salt water 2. For example, inlet 11 should preferably be circular in shape, of relatively large diameter, and otherwise designed hydrodynamically to minimize production of any turbulence that could be transmitted upward to interfere with the stable, effectively stratified condition of column of salt water 2. If desired, conventional turbulence barrier baffles or other conventional baffle means may be included in column of water 2 to minimize the impartation of stirring or mixing motion to that body of water.

After the apparatus of FIG. 1 is utilized for a period of time in the manner that has been described, the concentration of foreign substances dissolved in main column of salt water 2 will reach a steady state condition in which that concentration varies substantially continuously from the greatest concentration at the bottom of the column to the lowest concentration at top. At each successive levels within the continuously varying concentration from the bottom portion to the top portion of column of salt water 2, if the apparatus of FIG. 1 is utilized in accordance with the preceding description, the concentration of dissolved foreign substances in column 2 will be substantially the same throughout any given level. As a result, the column of salt water is effectively horizontally stratified from its bottom portion to its top portion.

The concentration of foreign substances dissolved in column of salt water 2 may be measured by any conventional means. One example would be to utilize a probe comprising a sensor to measure the electrical resistance presented at any given level in the column, which resistance will inversely reflect the level of concentration of the foreign substance.

When the apparatus of this invention is employed to treat water containing already low concentrations of impurities to produce what is known as "ultrapure" water at the top of column 2, it may not be possible to detect any foreign substances at all in the water at that point through use of any available measuring device. Column 2 can nevertheless be characterized, for purposes of description of the apparatus and method of this invention, as constituting "salt water" at its top—either salt water of zero salt concentration, or salt water having a concentration not detectable by available instrumentation.

The complete apparatus of this invention includes the apparatus set up and operated as described above, with the defined elements of the apparatus including various types and quantities of salt water. The method of this invention likewise includes utilization of all those elements in the steps recited as parts of the method. An important subcombination invention is the apparatus described as it would be shipped by the manufacturer, without any salt water contained therein.

FACTORS AFFECTING OPERATION

An understanding of the operation of the apparatus properly begins with the observation that in the embodiment being described a portion of the melt water is used to rinse the rising ice. This water ultimately rejoins the brine at the bottom of the rinse apparatus. The remainder of the melt water is discharged as fresh water product.

The maximum rate of melt water production is determined in this embodiment by the capacity of the heat pump to produce ice. At one extreme, at which there is maximum product output (i.e., all the melt water is drawn as fresh water product), no melt water will be available for rinsing and the fresh water product will have only that degree of purity which may be realizing from the melting of unrinsed ice. A variety of factors will influence this figure. For example, the volumetric ratio of fresh water output to source brine input will determine the concentration of salt in the brine at the bottom of the apparatus which, in this extreme, also constitutes the rinse water. Other relevant factors include the size, shape and structure of the ice product, since these will influence the quantity of clinging and entrained brine.

The opposite extreme is the case where only an infinitesimal amount of fresh water is drawn as product water. In this instance, essentially all the melt water is available for rinsing and the product water will be of maximum purity. Accordingly, somewhat different factors will influence product purity. For example, an increase in the distance from the ice maker 7 to the ice melter 8 will improve the product purity. This becomes apparent if we reason in the following manner: The effect of the ice pieces as they float upward at their terminal velocity through the rinse water is to stir and mix together adjoining effective strata of rinse water over a physical distance dictated by the physical size, shape and velocity of the ice pieces. Within the strata bracketed by this stirring action there exists a range of salinity values which are strictly a function of the column length. Consequently, in a longer column the range of salinity values found in these adjoining effective strata will be less, and the impact of the stirring action less pronounced, than would be the case in a shorter column.

A related line of reasoning is as follows: For a given throughout of ice, the amount of physical stirring experienced by any given stratum is independent of column length, whereas the period of time over which the ice pieces experience useful rinsing is a direct function of column length. As a result, ice will be more thoroughly rinsed in a long column.

Between these two extremes (maximum and minimum fresh water product output) there exists a continuous spectrum of performance trade-offs involving three fundamental variables:

(1) Fresh water product purity.
(2) Volumetric output of fresh water.
(3) Volumetric ratio of input brine to output brine.

Any one of these variables may be optimized at the expense of one or both of the other variables.

The two key system variables are crystal size and column height. For example, throughput increases as crystal size increases because the lower surface area to volume ratio which characterizes the larger crystal permits a higher terminal velocity for the crystal as it floats to the top of the rinse column.

In contrast, product purity is favored by a small crystal size. Because the small crystal moves more slowly, more time is provided to enable the process of diffusion to bring the concentration of salt at the surface of the crystal into equilibrium with the surrounding medium. Also important is the fact that smaller crystals are less likely to have salt entraining flaws.

Rinse efficiency is a mixed phenomenon. The greater surface area to volume ratio of the smaller crystals will transport more clinging brine. On the other hand the smaller, slower moving crystals will enable the process of diffusion to function more effectively in stripping brine from the crystals. Likewise the slower crystal movement will cause less stirring action as the crystals float to the top.

As already noted, both product purity and rinse efficiency exhibit a direct positive relationship to column height. Under steady state conditions, throughput is unrelated to column height.

The useful limit on product purity is established by the concentration of impurities bound within the ice crystals.

Investigators have established that the process by which the ice crystal lattice excludes impurities is normally perfect to the limits of measurement. To the extent that impurities are present within some crystals, these impurities occupy structural chambers which are created when the crystal lattice surrounds and entraps droplets of brine. Such flaws in the structure of the crystal are less common with smaller crystals.

Under normal operating conditions, the column of rinse water in a rinse apparatus in accordance with my invention will exhibit a continuous logarithmic variation in salt concentration from the bottom of the column where salts are most concentrated to the top where the salts are least concentrated. When the limit of product purity is approached, further increases in the rinse to product water ratio will result in a termination of the logarithmic relationship at a level some distance below the top of the column, leaving the upper portion of the column having an essentially constant salt concentration.

One practical method for regulating the operation of the apparatus would involve the continuous measurement of the electrical resistivity of the fresh water product.

For example, if we wish to maintain a certain level of fresh water purity, this could be accomplished by making the ratio of fresh water output to waste brine output responsive to the resistance of the fresh water such that the ratio would be increased as the resistance of the fresh water decreased. A variety of useful control feedback loops will be apparent to those skilled in the relevant art.

OTHER EMBODIMENTS

There are circumstances where it might be desirable to design a rinse apparatus in accordance with my invention using ice that has been manufactured external to the apparatus and is stored external to the apparatus. For example, sub-zero weather might be used to freeze a brine spray with the washed ice product stored for the purpose of providing both fresh water and air conditioning during the summer. If the ice and brine are in the form of a slurry, an apparatus in accordance with my invention might be very similar to that already described with the exception that the heat pump serves only to make and melt ice at a rate sufficient to provide the desired ratio of rinse water to ice product. It also is feasible to eliminate the heat pump and use an alternative source of heat such as electricity or solar energy to generate the rinse water. Another possibility would be to draw upon an external store of fresh water for the purpose of providing rinse water, or these last two approaches might be combined such that warm fresh water is injected at the top of the column where its volume is increased by a partial melt of the ice at the top of the column.

In the event that externally generated ice is not in a form suitable for handling with conventional plumbing hardware, there arises the need to design special insertion and extraction hardware which is adapted to the physical characteristics of the ice as it enters and leaves the system. However, in all such instances apparatus in accordance with my invention will include a stable, effectively stratified rinse column normally exhibiting the above described logarithmic relationship between concentration of dissolved impurities and stratum level within the column; means for introducing ice at the bottom of the column; and means for removing ice from the top of the column. In addition, fresh rinse water will be introduced at the top of the column, either from an external source, local melting or a combination of the two, and heavy brine will be drawn from the bottom of the column.

The above detailed description has been given for clearness of understanding only. No unnecessary limitations should be understood therefrom, as modifications will be obvious to those skilled in the art.

I claim:

1. An apparatus for producing an effectively stratified vertical column of salt water containing at least one foreign substance dissolved therein, from the top of which column water of a certain degree of purity can be obtained, and from the bottom of which column a concentrate of a certain concentration can be obtained, which apparatus comprises:

(a) a vertically oriented, heat insulated, watertight duct;

(b) a column of chilled water confined in said duct, said water containing said at least one foreign substance dissolved therein, said column of water having a bottom and a top;

(c) means for introducing small, individual pieces of ice into said column of salt water adjacent the bottom thereof at such a rate and in such a manner that said individual pieces of ice float freely and separately from the bottom portion to the top portion of said column of water, without being packed together, while water containing said at least one foreign substance that clings to said small, individual pieces of ice is carried up through said column of water and is rinsed off said pieces of ice by water at successively higher levels in said column;

(d) means for removing said small, individual pieces of ice from the top of said column of salt water after they have floated freely and separately, as aforesaid, up to the top of the column;

(e) means for introducing added rinse water into the top of said column of salt water, the volume of added rinse water thus introduced being the quantity necessary to maintain the concentration of said at least one foreign substance in said column of salt water at the top thereof at a level no higher than a first predetermined maximum concentration when the desired end product from the use of said effectively stratified column of water is water of said certain degree of purity;

(f) means for removing heavy brine from the bottom of said column of salt water, the volume of heavy brine thus removed being the quantity necessary to maintain the concentration of said at least one foreign substance in said column of salt water at the bottom thereof at a level no higher than a second predetermined maximum concentration when the desired end product from the use of said effectively stratified column of water is concentrate of said certain concentration, said second predetermined maximum concentration being substantially higher than said first predetermined maximum concentration; and (g) means for introducing a quantity of added salt water into said column of salt water, the volume of said quantity of added salt water, plus the volume of any small, individual pieces of ice introduced from outside the duct into said column of chilled water, plus the volume of any additional rinse water introduced from outside the duct into the column of chilled water being substantially equal to the volume of said pieces of ice removed as described above, plus the volume of any heavy brine removed as described above, said means for introducing pieces of ice, said means for removing pieces of ice, said means for introducing added rinse water, said means for removing heavy brine, and said last mentioned means for introducing added salt water all being adapted to minimize the impartation of stirring or mixing motion to said column of salt water, whereby, after said introduction and removal of said pieces of ice, said introduction of added rinse water, said removal of heavy brine, and said introduction of a quantity of added salt water have been carried out for a period of time, the concentration of said at least one foreign substance dissolved in said column of salt water varies substantially continuously from the greatest concentration at the bottom of said column to the lowest concentration at the top thereof, with the concentration at any given level in said column of salt water being substantially the same throughout said given level.

2. The apparatus of claim 1 in which said means for removing said small, individual pieces of ice from the top of said column of salt water comprises (a) means for melting said small, individual pieces of ice after they have floated freely and separately to the top portion of said column of salt water and (b) outlet means to conduct said melted water from said duct.

3. The apparatus of claim 1 or 2 in which said means for introducing said small, individual pieces of ice into said column of salt water at the bottom thereof includes means located within said column of salt water for forming said pieces of ice in situ.

4. The apparatus of claim 1 or 2 in which said means for introducing said small, individual pieces of ice into said column of salt water at the bottom thereof includes means for piping into the bottom portion of said column of salt water a slurry containing small, individual pieces of ice already formed.

5. An apparatus for rinsing clinging water containing at least one foreign substance dissolved therein from small, individual pieces of ice comprising:
(a) a vertically oriented, heat insulated, watertight duct;
(b) an effectively stratified column of chilled saline water contained within said duct, said column of water having a bottom portion and a top portion, and in effect having horizontal strata of saline water which vary continuously in concentration of salt from relatively salty in the bottom portion of said column to less salty in the top portion of said column, the concentration at any given level in said column of saline water between said bottom and top portions thereof being substantially the same throughout said given level;
(c) means for introducing said small, individual pieces of ice into the bottom portion of said column of saline water at a rate sufficiently low and in such a manner that each of said pieces of ice floats freely and separately from the bottom portion of said column of saline water to the top portion of said column without being packed together with any of the other of said pieces of ice, while water containing said at least one foreign substance that clings to said small, individual pieces of ice is carried up through said column of saline water and is rinsed off said pieces of ice by water at successively higher levels in said column;
(d) means for removing said small, individual pieces of ice, after they have floated freely and separately to the top portion of said column, from said column of saline water;
(e) means for removing relatively salty water from the bottom portion of said column; and
(f) means for introducing a quantity of added salt water into said column of water, said means for introducing pieces of ice, removing pieces of ice, introducing added rinse water, removing relatively salty water, and introducing added salt water all being adapted to minimize the impartation of stirring or mixing motion to said water column, and to preserve the above mentioned salt concentrations within each of said given levels within said column of water.

6. The apparatus of claim 5 in which the respective concentration of salt at each of said given levels within said effectively stratified column of saline water is such that the logarithm of said concentrations is essentially a linear function of the elevation of each of said given levels as measured from the bottom of said column of saline water.

7. Apparatus for treating a salty water product to remove dissolved foreign substances therefrom, which comprises:
(a) a vertically oriented, heat insulated, watertight duct adapted for containing an effectively stratified column of chilled salt water, which column of salt water has a bottom portion and a top portion and has at least one foreign substance dissolved therein, with the concentration of said at least one foreign substance varying substantially continuously from the greatest concentration in the bottom portion of said column of salt water to the lowest concentration in the top portion thereof, with the concentration at any given level in said column of water between said bottom and top portions thereof being substantially the same throughout said given level, said lowest concentration being no higher than a first predetermined concentration when the desired end product from the use of said effectively stratified column of water is water of said first, predetermined degree of purity, and said greatest concentration being no higher than a second predetermined concentration when the desired end product of the use of said effectively stratified column of water is concentrate of said second, predetermined maximum concentration, said duct having a side wall, a bottom wall, and a top wall;
(b) means adapted for introducing small, individual pieces of ice into said column of salt water in the bottom portion of said column adjacent the bottom wall of said duct, at such a rate and in such a manner that said individual pieces of ice float freely and separately from the bottom portion to the top portion of said column of water, without being packed together, while water containing said at least one foreign substance that clings to said small, individual pieces of ice is carried up through said column of water and is rinsed off said pieces of ice by water at successively higher levels in said column;
(c) means adapted for removing said small, individual pieces of ice from the top portion of said column of water contained in said duct after they have floated freely and separately, as aforesaid, up to the top of said column;

(d) means for introducing added rinse water into said column of water adjacent the top portion of said column of salt water;

(e) an outlet defined by said duct walls adapted for removing heavy brine from said column of salt water, said outlet being located adjacent said bottom wall; and (f) an inlet defined by said duct walls adapted for introducing into said column of salt water, adjacent the bottom wall of said duct, salt water to be treated, said salt water thus introduced containing said at least one foreign substance dissolved therein that is to be removed therefrom, said means for introducing pieces of ice, removing pieces of ice, adding rinse water, removing heavy brine and introducing salt water to be treated all being adapted to minimize the impartation of stirring or mixing motion to a column of water contained in said duct.

8. The apparatus of claim 7 in which said means adapted for removing said small, individual pieces of ice from the top portion of said column of water contained in said duct includes:

(a) an ice melter positioned within said duct, said ice melter being adapted to heat a zone in said column of salt water adjacent the top wall of said duct; and (b) an outlet defined by said duct walls, said outlet being located adjacent said duct top wall and being adapted for removing water derived from the melting of said small, individual pieces of ice after they have risen into the zone heated by said ice melter in the top portion of said column of salt water.

9. The apparatus of claim 7 which includes:

(a) an outlet defined by said duct walls for withdrawing brine from the interior of said duct, said brine outlet being located adjacent the bottom wall of said duct; and (b) a circulation pump for recirculating said brine withdrawn from said brine outlet to said means adapted for introducing said small, individual pieces of ice into said column of salt water.

10. The apparatus of claim 7 in which said means for introducing said small, individual pieces of ice into said column of salt water comprises an ice maker positioned within said duct, adjacent the bottom wall thereof, for in situ formation of said pieces of ice.

11. The apparatus of claim 10 which includes an ice melter positioned within said duct adapted to heat a zone in said column of salt water adjacent the top wall of said duct, and in which said ice maker and said ice melter are constituent parts of a heat pump for drawing heat from said bottom portion of said column of water and providing heat for melting said small, individual pieces of ice after they have risen freely and separately to said melting zone at the top portion of said column of water.

12. The apparatus of claim 9 in which said inlet for said salt water to be treated is located at a level above said ice maker.

13. A method of treating a salty water product containing at least one foreign substance dissolved therein to remove a sufficient amount of said at least one foreign substance either to produce water at a first location having a concentration of said at least one foreign substance no higher than a first predetermined concentration, or water at a second location having a concentration of said at least one foreign substance no higher than a second predetermined concentration, said second predetermined concentration being higher than said first predetermined concentration, which method comprises:

(a) providing a vertically oriented, heat insulated, watertight duct, said duct having a side wall, a bottom wall, and a top wall;

(b) filling said duct with a column of chilled water, at least part of which is water including some concentration of said at least one foreign substance, said column of water having a bottom portion and a top portion;

(c) introducing small, individual pieces of ice into said bottom portion of said column of water at a location adjacent said bottom wall of said duct, which pieces of ice then float, by reason of their lower specific gravity compared with the specific gravity of the water in which they are immersed, to the top portion of said column of water, the rate and manner of introduction of said small pieces of ice being such that each of said individual pieces rises freely and separately within said column of water, without being packed together with any other of said small pieces of ice, while water containing said at least one foreign substance that clings to said small, individual pieces of ice is carried up through said column of water and is rinsed off said pieces of ice by water at successively higher levels in said column;

(d) removing said small, individual pieces of ice from the top portion of said column of water after they have floated freely and separately, as aforesaid, up to the top of the column;

(e) introducing added rinse water into the top portion of said column of salt water, the volume of added rinse water thus introduced being the quantity necessary to maintain the concentration of said at least one foreign substance in said column of salt water in the top portion thereof at a level no higher than a first predetermined concentration when the desired end product from use of the defined method is water of a certain degree of purity;

(f) removing heavy brine from the bottom portion of said column of salt water through an outlet adjacent said bottom portion of the column;

the volume of heavy brine thus removed being the quantity necessary to maintain the concentration of said at least one foreign substance in said column of salt water at said outlet at a level no higher than a second predetermined concentration when the desired end product from use of the defined method is concentrate of a certain maximum concentration;

(g) introducing a quantity of added salt water into the bottom portion of said column of salt water, the volume of said quantity of added salt water, plus the volume of any small, individual pieces of ice introduced from outside the duct into said column of chilled water, plus the volume of any additional rinse water introduced from outside the duct into said column of chilled water being substantially equal to the volume of said pieces of ice removed as described above, plus the volume of any heavy brine removed as described above, said steps of introducing pieces of ice, removing pieces of ice, introducing added rinse water, removing heavy brine, and said last mentioned step of introducing added salt water all being carried out at such a rate and in such a manner as to minimize the impartation of stirring or mixing motion to said column of salt water;

whereby, after said introduction and removal of said pieces of ice, said introduction of added rinse water, said removal of heavy brine, and said introduction of a volume of added salt water have been carried out for a period of time, the concentration of said at least one foreign substance dissolved in said column of salt water varies substantially continuously from the greatest concentration in the bottom portion of the column of water to the lowest concentration in the top portion thereof, with the concentration at any given level in said column of salt water between said bottom and top portions thereof being substantially the same throughout said given level.

14. The method of claim 13 in which said removal of said small, individual pieces of ice from said top portion of said column of water after they have floated freely and separately, as aforesaid, up to the top portion of the column is carried out by:
   (a) heating a zone in the column of salt water adjacent the top wall of said duct; and
   (b) removing water derived from the melting of said small, individual pieces of ice after they have risen into said heated zone in the top portion of said column of salt water.

15. The method of claim 13, in which said small, individual pieces of ice are introduced into said bottom portion of said column of salt water by withdrawing heat from said bottom portion to form said pieces of ice in situ.

16. The method of claim 15 in which:
   (a) a heat pump is utilized to remove heat from the bottom portion of said column of salt water to form said small, individual pieces of ice; and
   (b) said heat pump is in addition utilized to melt said pieces of ice after they have risen freely and separately to the top portion of said column of water.

17. The method of claim 13 which includes:
   (a) withdrawing brine from the interior of said duct at a location adjacent the bottom wall of said duct; and
   (b) recirculating said withdrawn brine by introducing it into the bottom portion of said column of salt water, with a portion of said brine thus introduced being in the form of small, individual pieces of ice.

18. The method of claim 13 in which said small, individual pieces of ice are introduced into said bottom portion of said column of salt water from outside said duct in the form of a slurry comprising a volume of salt water with said pieces of ice contained therein.

19. The apparatus of claim 1 in which said means for introducing added rinse water into the top of said column of salt water comprises an inlet defined by said duct walls through which said added rinse water can be introduced from a source external to said column of salt water.

20. The apparatus of claim 5 in which said means for removing said small, individual pieces of ice from the top of said column of saline water comprises (a) means for melting said small, individual pieces of ice after they have floated freely and separately to the top portion of said column, and (b) outlet means to conduct said melted water from said duct.

21. The apparatus of claim 5 which includes means for introducing added rinse water into the top portion of said column of saline water from a source external to said column of water.

22. The apparatus of claim 7 in which said means for introducing said small, individual pieces of ice into said column of salt water comprises means for piping into the bottom portion of said duct a slurry containing small, individual pieces of ice already formed.

23. The apparatus of claim 7 in which said means for removing said small, individual pieces of ice from the top of said column of salt water comprises (a) means for melting said small, individual pieces of ice after they have floated freely and separately to the top portion of said column and (b) outlet means to conduct said melted water from said duct.

24. The apparatus of claim 7 in which said means for introducing added rinse water into said column of water adjacent the top portion of said column of salt water comprises an inlet defined by said duct walls through which said added rinse water can be introduced from a source external to said column of salt water.

25. The method of claim 13 in which added rinse water is introduced into the top portion of said column of salt water from a source external to said column of salt water.

* * * * *